(12) United States Patent  (10) Patent No.: US 7,805,047 B2
Rikimaru et al.  (45) Date of Patent: Sep. 28, 2010

(54) OPTICAL TRANSMISSION SYSTEM (75) Inventors: Kenji Rikimaru, Fukuoka (JP); Yuji Ishii, Fukuoka (JP); Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1 day.

(21) Appl. No.: 11/889,185

(22) Filed: Aug. 9, 2007

(65) Prior Publication Data

US 2008/0285915 A1 Nov. 20, 2008

(30) Foreign Application Priority Data

Aug. 10, 2006 (JP) ............................. 2006-218540

(51) Int. Cl.
*G02B 6/00* (2006.01)
*G02F 1/29* (2006.01)
(52) U.S. Cl. ....................... 385/140; 359/319
(58) Field of Classification Search ................ 385/140; 359/318–319
See application file for complete search history.

(56) References Cited

U.S. PATENT DOCUMENTS

| 6,292,616 | B1 * | 9/2001 | Tei et al. ..................... 385/140 |
| 7,295,748 | B2 * | 11/2007 | Chen et al. ................. 385/140 |
| 2001/0038730 | A1 | 11/2001 | Sorin et al. | |
| 2002/0076191 | A1 | 6/2002 | Fuchs et al. | |
| 2003/0081927 | A1 | 5/2003 | Wang et al. | |
| 2005/0047711 | A1 | 3/2005 | Ide et al. | |

FOREIGN PATENT DOCUMENTS

| JP | 53-37024 | 4/1978 |
| JP | 53-68232 | 6/1978 |
| JP | 2-83513 | 3/1990 |
| JP | 2004-70054 | 3/2004 |
| JP | 2005-99682 | 4/2005 |
| JP | 2007-101675 | 4/2007 |
| WO | 01/27681 | 4/2001 |
| WO | 03/012508 | 2/2003 |

OTHER PUBLICATIONS

"Japanese Office Action" mailed by JPO and corresponding to Japanese application No. 2006-218540 on Apr. 20, 2010, with English translation.

* cited by examiner

*Primary Examiner*—Jerry T Rahll
(74) *Attorney, Agent, or Firm*—Fujitsu Patent Center (57) ABSTRACT

An optical transmission system (1) alters quantity of incident light by reflecting an optical signal by a micro mirror (11) to enter an optical fiber (13) and by controlling an angle of the micro mirror (11), so that attenuation of the optical signal is controlled. An optical filter (14) is disposed between the micro mirror (11) and the optical fiber (13), for correcting a relationship between a control angle or control voltage of the micro mirror (11) and attenuation of the optical signal to be close to a linear relationship.

11 Claims, 13 Drawing Sheets

PRIOR ART

OPTICAL TRANSMISSION SYSTEM

BACKGROUND OF THE INVENTION

1. Field of the Invention

The present invention relates to an optical transmission system that adopts a variable optical attenuation (VOA) function. More specifically, the present invention relates to an optical transmission system that uses a micro mirror such as a micro electro mechanical systems (MEMS) mirror for reflecting an optical signal to enter an optical fiber and controls an angle of the micro mirror so that quantity of incident light is altered for controlling attenuation of the optical signal.

2. Description of the Prior Art

Conventionally, a micro mirror utilizing the MEMS technology, i.e., a digital micro-mirror device (DMD) is developed and is used for an optical switching system that is installed in a node of an optical network (see Japanese unexamined patent publication No. 2005-99682). The optical switching system includes a plurality of micro mirrors having reflection planes whose angles can be controlled and that are arranged on a plane. Optical signals that enter a plurality of input ports are reflected by the plurality of micro mirrors and are led to selected corresponding output ports among a plurality of output ports. Since the ports are switched in this way, it is able to perform optical exchange of a plurality of channels of optical signals on an optical transmission path.

Figure 10:
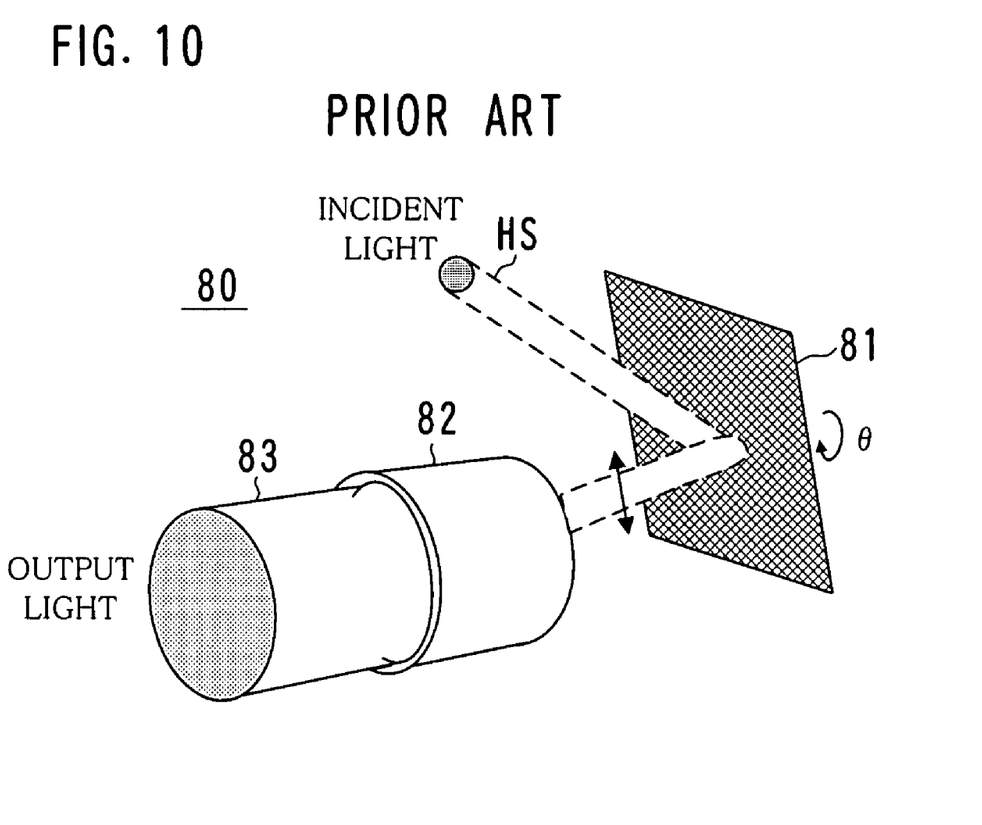
FIG. 10 is a perspective view showing an example of a structure of a conventional optical transmission system.

Furthermore, the optical transmission system is provided with an optical level attenuation function for adjusting intensity of the optical signal to be transmitted. FIG. 10 is a perspective view showing an example of a structure of a conventional optical transmission system 80 equipped with the optical level attenuation function, FIG. 11 is a front elevation of the optical transmission system 80 shown in FIG. 10, FIG. 12 is a diagram showing a principle of the optical level attenuation function, and FIG. 13 is a diagram showing a tolerance curve in the conventional optical transmission system 80.

Figure 11:
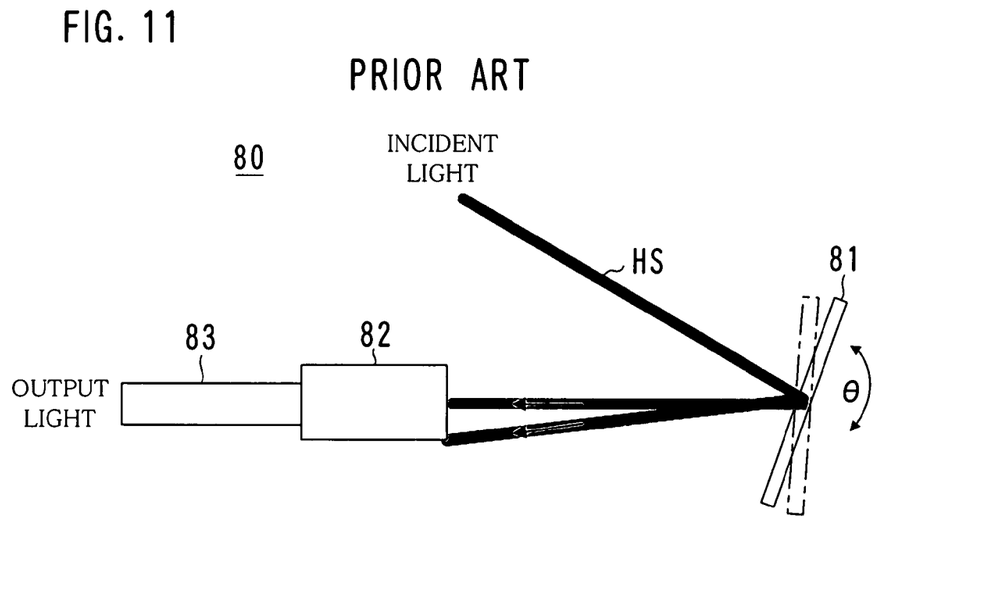
FIG. 11 is a front elevation of the conventional optical transmission system shown in FIG. 9.

In FIGS. 10 and 11, the optical transmission system 80 includes an MEMS mirror 81, a collimator lens 82, and an optical fiber 83. The optical signal HS that is incident light toward the mirror 81 is reflected by the mirror 81 and enters the collimator lens 82. Then, it propagates in the optical fiber 83 and is transmitted to the outside. In this case, if the angle θ of the mirror 81 is adjusted precisely, the incident position of the optical signal HS to the collimator lens 82 is altered.

Figure 12:
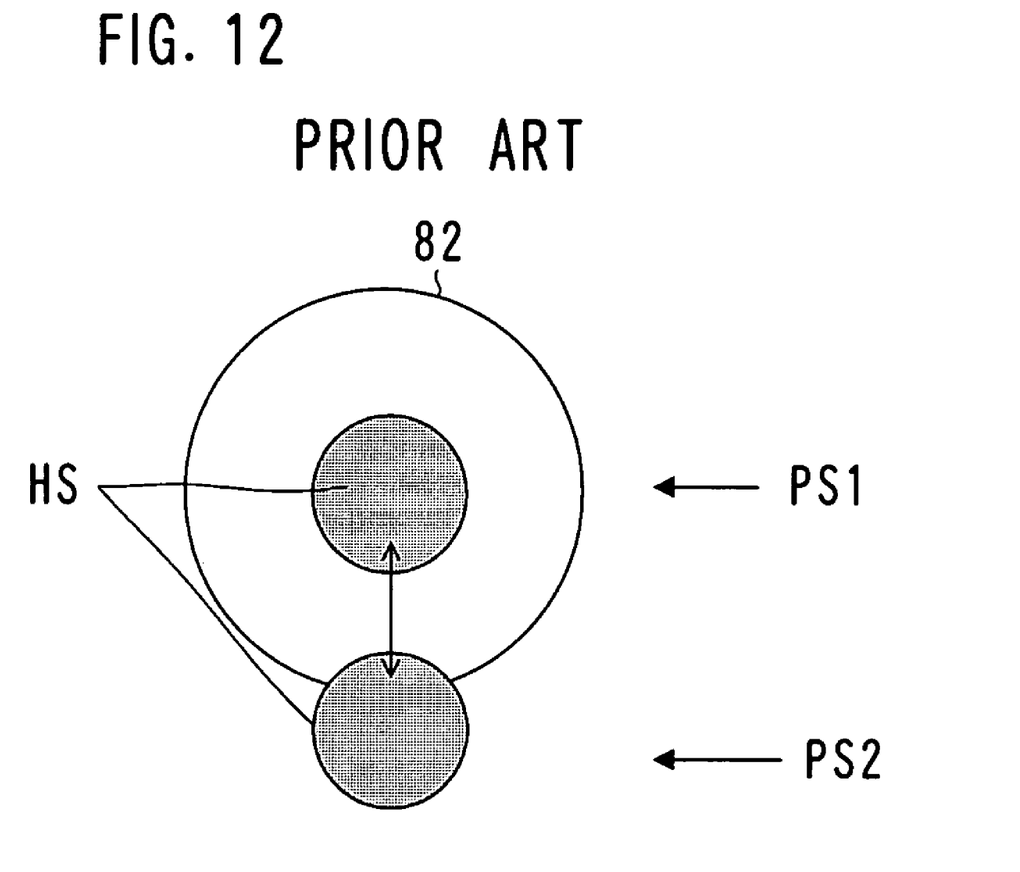
FIG. 12 is a diagram showing a principle of an optical level attenuation function.

In FIG. 12, if the center of the optical signal HS enters the center position PS1 of the collimator lens 82, attenuation (optical attenuation) becomes minimum so that the optical signal HS having the largest intensity is transmitted to the optical fiber 83. However, as the center of the optical signal HS is shifted to the edge portion of the collimator lens 82, attenuation increases so that intensity of the optical signal HS that is transmitted to the optical fiber 83 is decreased. For example, the attenuation becomes very large in the position PS2 where the center of the optical signal HS is out of the edge portion of the collimator lens 82.

Figure 13:
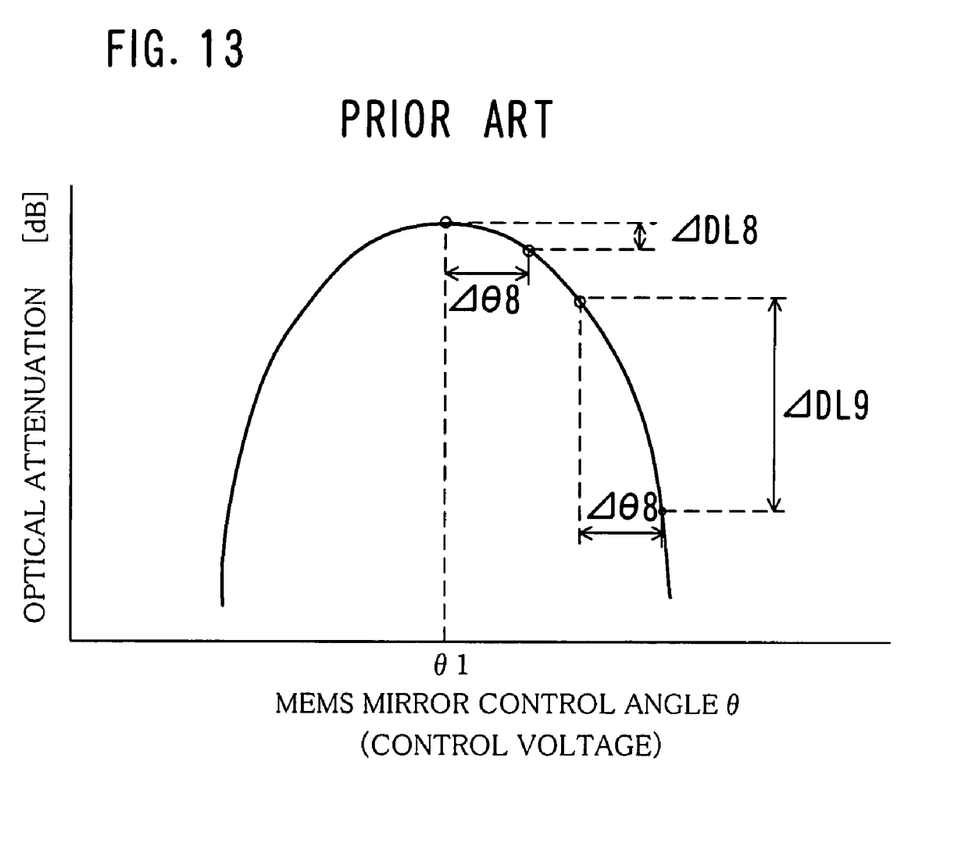
FIG. 13 is a diagram showing a tolerance curve in the conventional optical transmission system.

As a result, a relationship between a control angle θ applied to the mirror 81 and the attenuation is a curve like an inverted parabola shown in FIG. 13. More specifically, if the center of the optical signal HS is in the vicinity of the center position PS1 of the collimator lens 82, a variation of attenuation (ΔDL8) with respect to a variation of control angle θ (Δθ8) is small. In contrast, as the center of the optical signal HS goes to the edge portion of the collimator lens 82, a variation of attenuation (ΔDL9) with respect to a variation of control angle θ (Δθ8) becomes large. In other words, as the optical signal HS goes to the edge portion of the collimator lens 82, the attenuation (ΔDL) increases together with an increase of the attenuation with respect to the same variation of the control angle θ so as to alter in an order of square approximately. In this way, in the conventional structure, attenuation (db) is substantially proportional approximately to square of the control angle θ.

As described above, the conventional optical transmission system 80 adjusts the optical path of the optical signal HS by the mirror 81, so that the attenuation is adjusted by the quantity of incident light to the collimator lens 82. Therefore, as an optical attenuation effect, quantity of incident light is attenuated in accordance with Gauss theorem with respect to characteristics of angle variation to control voltage applied to the mirror 81 and an angle. Therefore, the relationship between the control angle θ of the mirror 81 and the attenuation is not linear.

In the conventional structure, an apparent characteristic correction is performed by the control voltage to be applied to the mirror 81, which has a characteristic opposite to the curve shown in FIG. 13, e.g., a root characteristic, for example. In this case too, however, the relationship between variation of the control angle θ by the control voltage to be actually applied to the mirror 81 and variation of the attenuation is not linear.

Therefore, there is a problem that if the optical signal HS is positioned at the vicinity of the end portion of the collimator lens 82 for obtaining large attenuation, it is affected easily by a variation of the control voltage, a power source noise or an external noise, resulting in that a variation of intensity of the optical signal HS is generated easily.

SUMMARY OF THE INVENTION

An object of the present invention is to provide an optical transmission system that is hardly affected by variation of the control voltage or noise by correcting the relationship between the control angle of the mirror and attenuation of the optical signal to be closely linear.

An optical transmission system according to one aspect of the present invention is an optical transmission system that alters quantity of incident light by reflecting an optical signal by a micro mirror to enter an optical fiber and by controlling an angle of the micro mirror, so that attenuation of the optical signal is controlled. An optical filter is disposed between the micro mirror and the optical fiber, for correcting a relationship between a control angle or control voltage of the micro mirror and attenuation of the optical signal to be close to a linear relationship.

Preferably, the end surface of the optical fiber may be provided with a cylindrical collimator lens, and the optical signal may enter the optical fiber through the collimator lens.

In addition, the optical filter may have optical characteristics in which optical transmittance thereof decreases from one position to another position on the outer edge thereof along a locus of the optical signal, and the optical filter may be disposed so as to correct light quantity of the optical signal that enters corresponding to a radius from the center position to a position on a circumference edge of the collimator lens.

In addition, the optical filter may be disposed so as to correct light quantity of the optical signal that enters corresponding to a radius of the collimator lens on the side of a larger reflection angle of the optical signal by the micro mirror.

In addition, a deflection lens may be disposed between the micro mirror and the optical filter, for deflecting the optical signal to be parallel with the optical axis of the collimator lens.

In addition, a condenser lens that is a convex lens may be disposed between the optical filter and the collimator lens, and the optical signal from the optical filter may be condensed by the condenser lens and may enter the collimator lens.

In addition, a deflection lens may be disposed between the condenser lens and the collimator lens, for deflecting the optical signal to be parallel with the optical axis of the collimator lens.

According to the present invention, a relationship between the control angle of the mirror and the attenuation of the optical signal is corrected to be close to a linear relationship, so that it is hardly affected by a variation of control voltage or a noise. As a result, stability of the optical signal is improved.

DESCRIPTION OF THE PREFERRED EMBODIMENTS

The invention will now be described in detail with reference to the attached drawings.

First Embodiment

Figure 1:
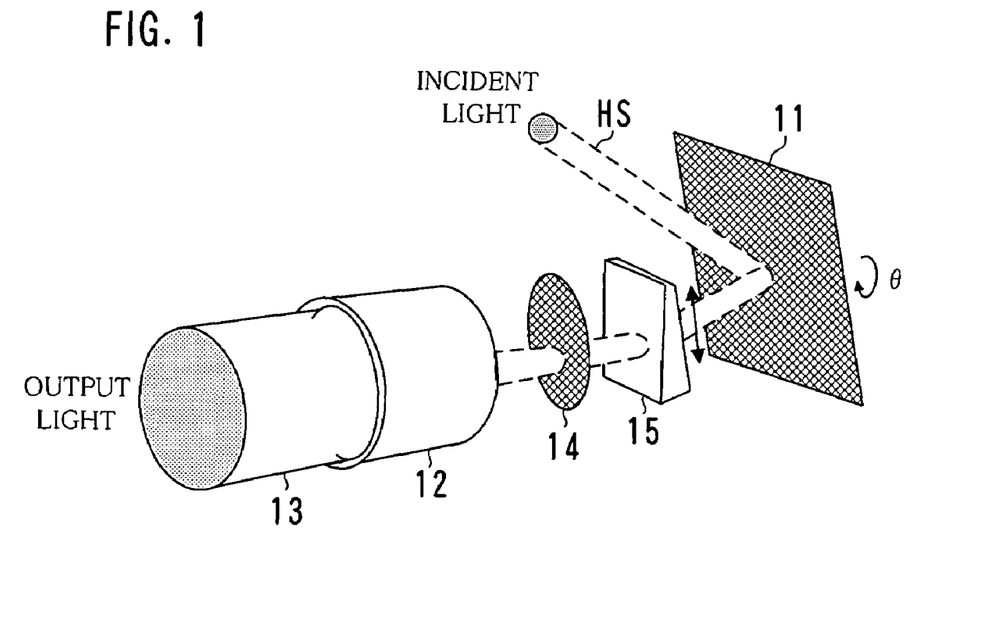
FIG. 1 is a perspective view showing a structure of a main portion of an optical transmission system according to a first embodiment of the present invention.
Figure 2:
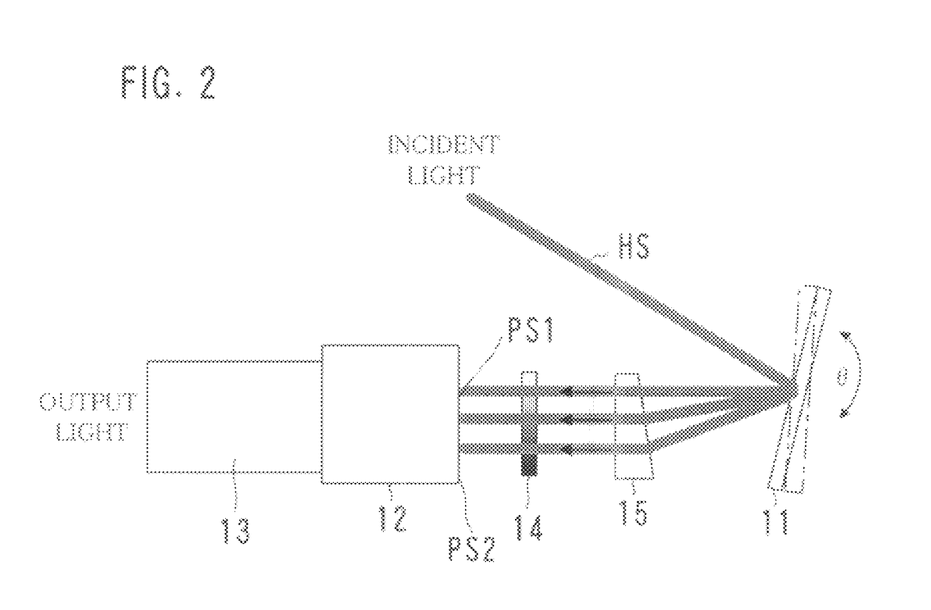
FIG. 2 is a front elevation of the optical transmission system.
Figure 3:
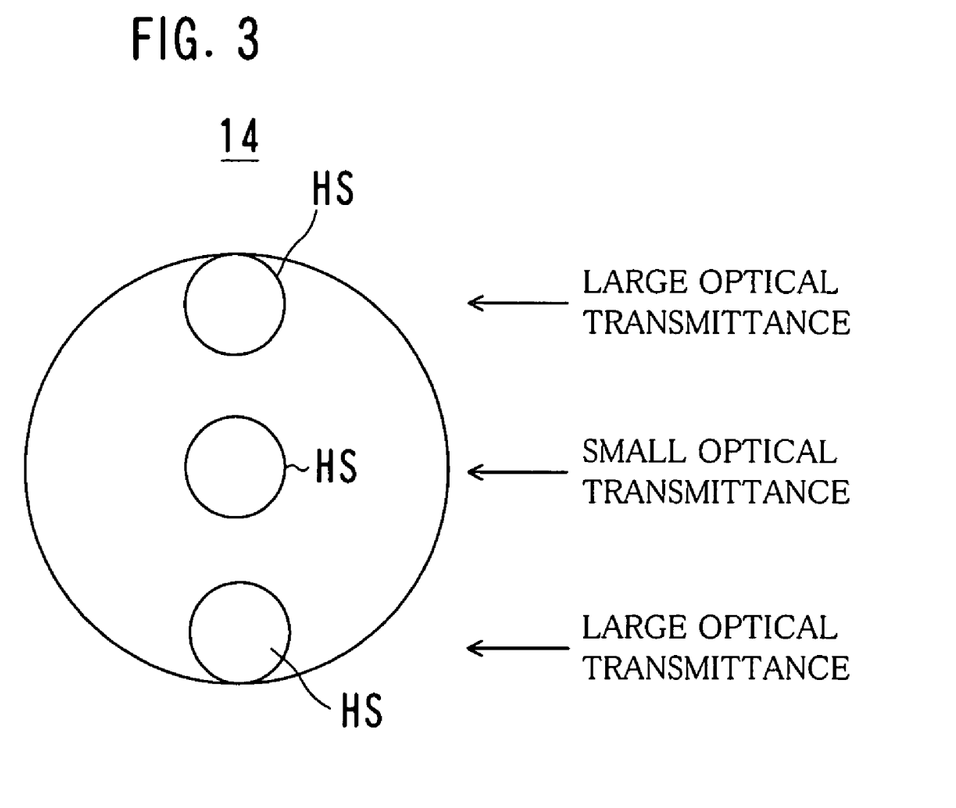
FIG. 3 is a diagram for explaining a distribution of transmittance of a profile sheet.
Figure 4:
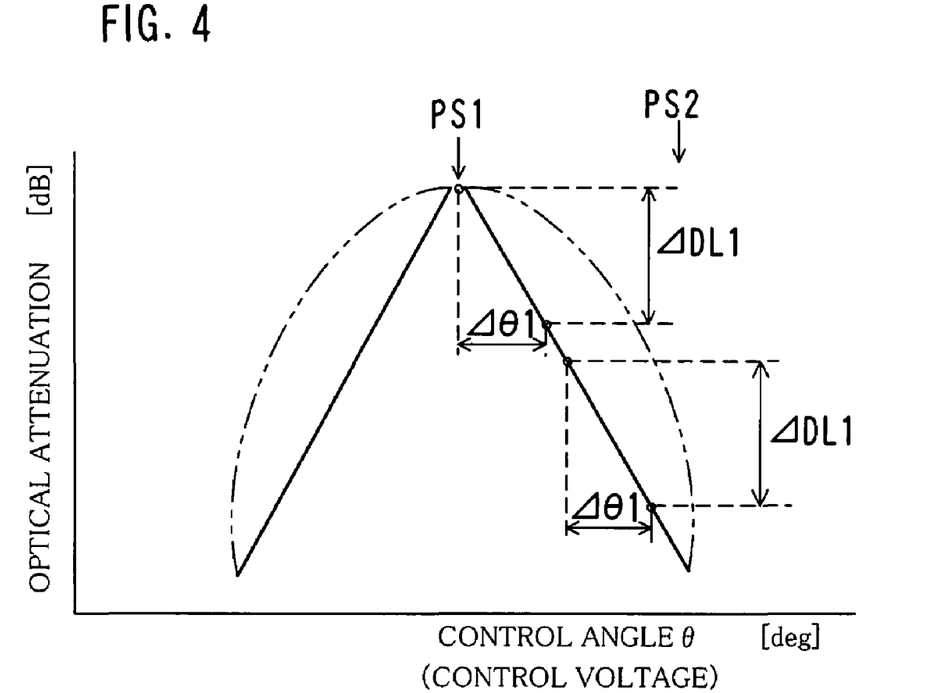
FIG. 4 is a diagram showing a tolerance curve of a relationship between a control angle and attenuation.
Figure 5:
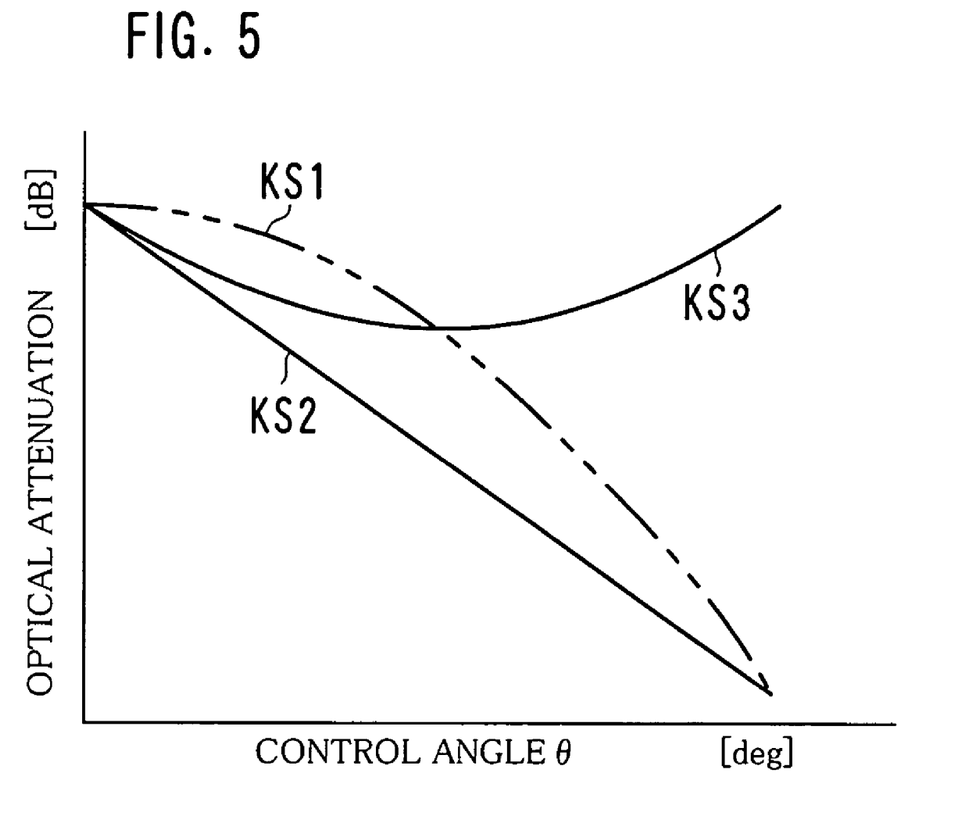
FIG. 5 is a diagram for explaining optical characteristics of the profile sheet.
Figure 6A:
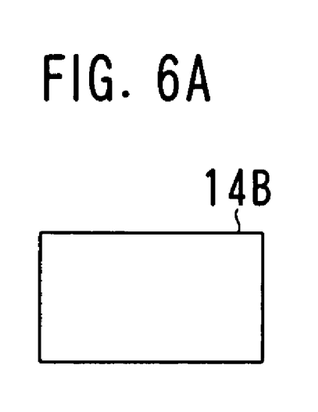
FIGS. 6A-6C are diagrams showing some variations of the contour of the profile sheet.
Figure 6B:
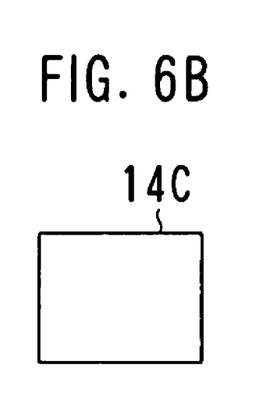
Figure 6C:
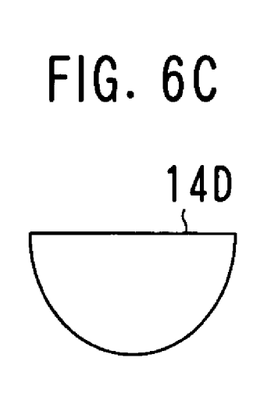

FIG. 1 is a perspective view showing a structure of a main portion of an optical transmission system 1 according to a first embodiment of the present invention, FIG. 2 is a front elevation of the optical transmission system 1, FIG. 3 is a diagram for explaining a distribution of transmittance of a profile sheet 14, FIG. 4 is a diagram showing a tolerance curve of a relationship between a control angle θ and attenuation, FIG. 5 is a diagram for explaining an optical characteristics of the profile sheet 14, and FIG. 6 is a diagram showing some variations of the contour of the profile sheet.

In FIGS. 1 and 2, the optical transmission system 1 includes a mirror (micro mirror) 11 using the MEMS, a collimator lens 12, an optical fiber 13, a profile sheet 14, and a deflection lens 15.

An optical signal HS that is incident light toward the mirror 11 is reflected by the mirror 11 and enters the deflection lens 15. Then, it passes through the profile sheet 14 and enters the collimator lens 12. Further, the optical signal HS propagates inside the optical fiber 13 and is transmitted to the outside. In this case, an incident position of the optical signal HS into the collimator lens 12 is changed and adjusted by adjusting the angle θ of the mirror 11 precisely, so that attenuation of the optical signal HS (optical attenuation) is adjusted to be a predetermined level.

The deflection lens 15 deflects the optical signal HS to be parallel with the optical axis of the collimator lens 12, thereby it is adjusted so that light enters the collimator lens 12 perpendicularly in spite of an angle of the mirror 11.

The profile sheet 14 is an optical filter for adjusting a relationship between the control angle θ or the control voltage V of the mirror 11 and the attenuation of the optical signal HS to be close to a linear relationship. The profile sheet 14 is made of glass or the like to be a disk-like shape having a thickness of approximately 0.1-1 mm. It has optical characteristics of optical transmittance that alters along the locus of the optical signal HS, i.e., along the diameter line in the vertical direction shown in FIG. 3 so as to decrease from the upper end of the outer edge to the center portion and to increase from the center portion to the lower end. In other words, attenuation in the center portion is large.

The profile sheet 14 is disposed so as to correct light quantity of the incident optical signal corresponding to radius portion of the collimator lens 12 on the side of large reflection angle of the optical signal HS by the mirror 11.

Note that a material and a manufacturing method of the profile sheet 14 are similar to those of an optical filter that is used as an optical attenuator, a variable attenuator, an ND filter or the like. This profile sheet 14 is disposed between the mirror 11 and the optical fiber 13.

As shown in FIG. 4, a relationship between the control angle θ of the mirror 11 and the attenuation is linear. More specifically, a variation of the attenuation (ΔDL1) with respect to the same variation of the control angle (Δθ1) is constant both in the case where the center of the optical signal HS is in the vicinity of the center position PS1 of the collimator lens 12 and in the case where it is in the vicinity of the edge portion PS2. Thus, the optical signal HS alters dynamically and linearly within the range from the center position PS1 to the edge portion PS2 of the collimator lens 12, e.g., within the range of approximately 0 to −20 db. Therefore, regardless of the incident position of the optical signal HS into the collimator lens 12, for example, even if the optical signal HS is positioned in the vicinity of the edge portion of the collimator lens 82 for obtaining large attenuation, it is hardly affected by a variation of the control voltage, a power source noise or an external noise similarly to the case where the optical signal HS is positioned in the vicinity of the center position PS1. Thus, a variation of intensity of the optical signal HS is hardly generated, so that stable operation and easy control can be obtained with little control error.

The attenuation in the case where the profile sheet 14 is not used is shown by the double dot and dashed line in FIG. 4, and the attenuation difference between the curve shown by the double dot and dashed line and the straight line shown by the full line is caused by the attenuation of the profile sheet 14. Therefore, it should be set so that the optical transmittance in each portion of the profile sheet 14 becomes the same as the attenuation difference between the curve shown by the double dot and dashed line and the straight line shown by the full line.

Although the straight line and the curve are shown in a bilaterally symmetric manner in FIG. 4 for comparison with the conventional example shown in FIG. 13, the profile sheet 14 of the above-mentioned embodiment has attenuation that is shown by the right half straight line of the angle shape shown by the full line in FIG. 4.

More specifically, in the present embodiment, the profile sheet 14 is disposed corresponding to the range between the center position PS1 and the lower edge of the collimator lens 12, so that the adjustment of the attenuation of the optical signal HS is performed in this range. Therefore, the control is performed by using the attenuation shown by only the right half straight line in FIG. 4.

This will be further described as below. In FIG. 5, attenuation based on Gauss theorem without the correction is shown by the curve KS1. This curve KS1 shows that the attenuation of the optical signal HS alters in proportion to the ratio of natural logarithm of square of the control angle θ. If the control angle θ is an optimal value, light quantity becomes maximum, therefore the attenuation becomes minimum. As the control angle θ increases, the attenuation as well as the variation of the attenuation increases.

In addition, the curve KS2 indicates variation of the attenuation to be a target. In other words, the curve KS2 indicates that the attenuation of the optical signal HS alters in proportion to the control angle θ. When a gradient of that is represented by γ, the attenuation is expressed as follows.

$$\text{attenuation} \approx \gamma \cdot \theta$$

In addition, the curve KS3 indicates optical characteristics of the profile sheet 14 (attenuation characteristics) that is necessary for obtaining the target attenuation. In other words, this curve KS3 is obtained by subtracting a value on the curve KS2 from a value on the curve KS1. According to this curve KS3, the attenuation is small (the optical transmittance is large) at both ends while the attenuation is large (the optical transmittance is small) in the middle portion. The attenuation to be a target can be obtained by writing the optical characteristics indicated by the curve KS3 on the profile sheet 14 in advance.

However, it is possible to manufacture the profile sheet having attenuation of the angle shape shown in the full line in FIG. 4 and to dispose the profile sheet corresponding to the entire circular surface of the collimator lens 12.

Although the profile sheet 14 has a circular shape in the example described above, it may have other shape. For example, it is possible to adopt a profile sheet 14B having a rectangular shape as shown in FIG. 6A, or a profile sheet 14C having a square shape as shown in FIG. 6B, or a profile sheet 14D having a semicircular shape as shown in FIG. 6C. In these cases, they should have optical characteristics in which the optical transmittance decreases or increases from the upper edge to the lower edge.

Second Embodiment

Next, an optical transmission system 1B according to a second embodiment will be described.

In the second embodiment, a condenser lens is added to the first embodiment.

Figure 7:
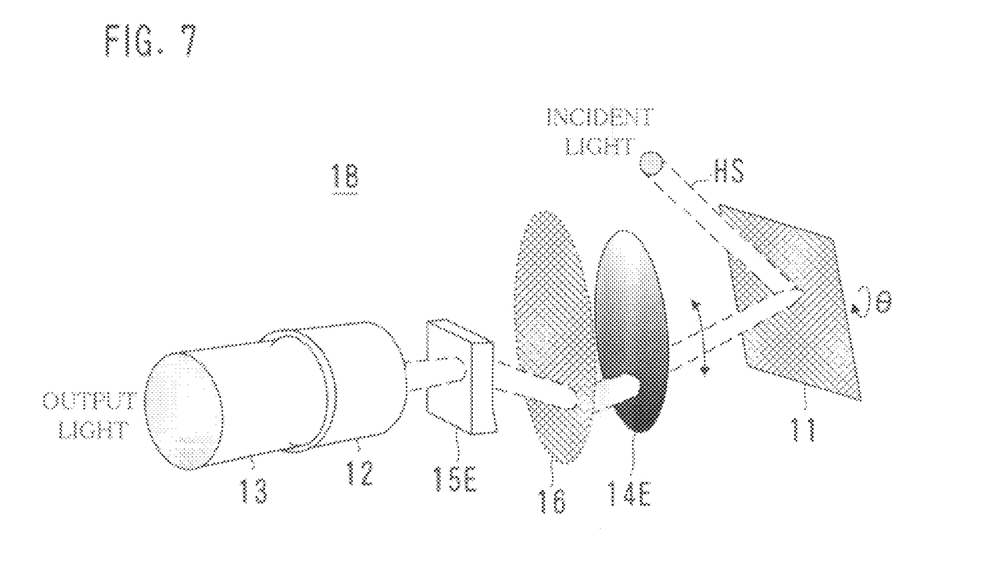
FIG. 7 is a perspective view showing a structure of a main portion of an optical transmission system according to a second embodiment of the present invention.
Figure 8:
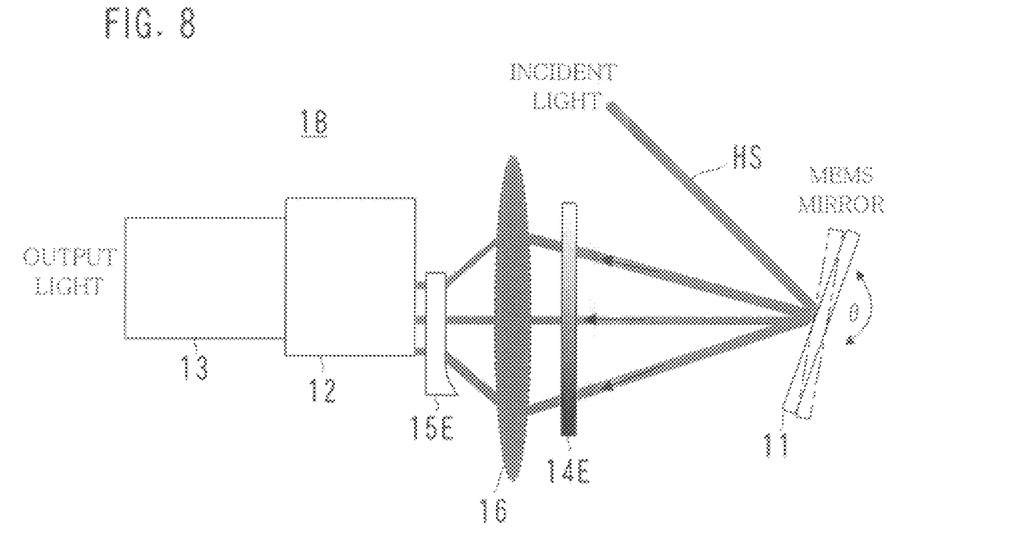
FIG. 8 is a front elevation of the optical transmission system.
Figure 9:
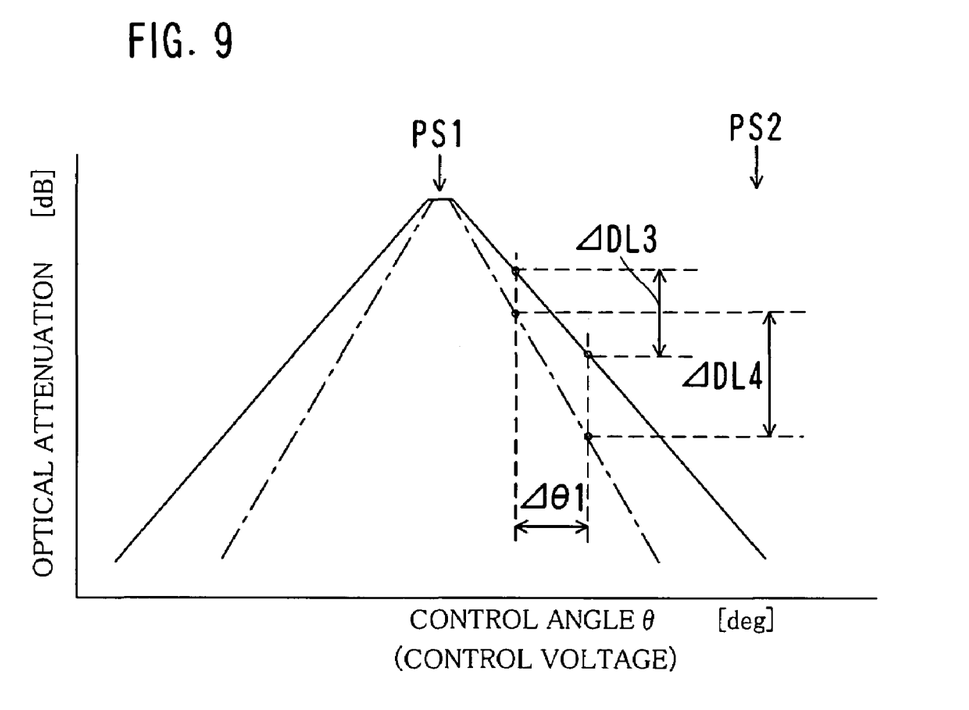
FIG. 9 is a diagram showing a tolerance curve of a relationship between a control angle and attenuation.

FIG. 7 is a perspective view showing a structure of a main portion of the optical transmission system 1B according to the second embodiment of the present invention, FIG. 8 is a front elevation of the optical transmission system 1B, and FIG. 9 is a diagram showing a tolerance curve of a relationship between a control angle θ and attenuation.

Note that the parts in these drawings having the same functions as in the first embodiment are denoted by the same reference signs so that descriptions thereof will be omitted or simplified.

In FIGS. 7 and 8, the optical transmission system 1B includes an MEMS mirror 11, a collimator lens 12, an optical fiber 13, a profile sheet 14E, a deflection lens 15E, and a condenser lens 16.

The condenser lens 16 is a convex lens and is disposed between the profile sheet 14E and the collimator lens 12. Thus, the optical signal HS from the profile sheet 14E is condensed by the condenser lens 16 so as to enter the collimator lens 12.

Therefore, the optical signal HS directed toward the mirror 11 is reflected by the mirror 11, passes through the profile sheet 14E, and is condensed by the condenser lens 16 to the center and its vicinity. Then, the optical signal HS is made parallel to the optical axis by the deflection lens 15E and enters the collimator lens 12. The incident position of the optical signal HS into the collimator lens 12 is changed and adjusted by adjusting the angle θ of the mirror 11 precisely, so that the attenuation of the optical signal HS is adjusted.

The profile sheet 14E is an optical filter for correcting so that a relationship between the control angle θ or the control voltage V of the mirror 11 and the attenuation of the optical signal HS becomes close to a linear relationship similarly to the case of the first embodiment. The profile sheet 14E is disposed between the mirror 11 and the condenser lens 16, and the optical signal HS that passed through the profile sheet 14E is condensed by the condenser lens 16. Therefore, a shape size of the profile sheet 14E can be increased compared with the case where the condenser lens 16 is not provided.

In this way, since a shape size of the profile sheet 14E can be increased due to presence of the condenser lens 16, a range of the control angle θ of the mirror 11 for adjusting the attenuation can be increased so that the control becomes easy and that control accuracy of a level of the optical signal HS can be improved. In addition, influences of a power source noise or an external noise can be reduced so that a variation in the intensity of the optical signal HS is hardly generated. In addition, since an outer shape of the profile sheet 14E can be increased, difficulty of micromachining of the profile sheet 14E is lowered so that productivity of the profile sheet 14E is improved.

As shown in FIG. 9 by the full line, a relationship between the control angle θ of the mirror 11 and the attenuation is like a straight line having a gentle gradient. In other words, the variation of the attenuation (ΔDL3) with respect to the same variation of the control angle (Δθ1) is constant both in the case where the center of the optical signal HS is in the vicinity of the center position PS1 of the collimator lens 12 and in the case where it is in the vicinity of the edge portion PS2. Thus, the optical signal HS alters dynamically and linearly from the center position PS1 to the edge portion PS2 of the collimator lens 12.

Further in FIG. 9, the attenuation in the case where the condenser lens 16 is not used is shown by the dot and dashed line. The straight line shown by the full line has smaller gradient than the straight line shown by the dot and dashed line has. Therefore, the variation of the attenuation with respect to the same variation of the control angle (Δθ1) is ΔDL4 in the case of the first embodiment while it is ΔDL3 in the case of the second embodiment. The latter is clearly smaller in variation of attenuation than the former.

This means that a larger variation of the control angle θ can be given for obtaining the same variation of the attenuation. Therefore, the adjustment of the attenuation by the control angle θ (or the control voltage V) becomes easier. In addition, influences of a variation of a voltage and a variation of a noise are reduced, so that more stable control can be performed and that stability of the optical signal HS in the attenuation can be ensured.

Although the adjustment of the attenuation of the optical signal HS is performed in the range from the center position PS1 to the lower edge portion PS2 of the collimator lens 12 in the above-mentioned embodiment, it is possible to perform the adjustment of the attenuation of the optical signal HS in the range from the center position PS1 to the upper edge portion of the collimator lens 12. In addition, as described above, it is possible to dispose the profile sheet corresponding to the entire edge surface of the collimator lens 12, so as to perform the adjustment of the attenuation of the optical signal HS in the range from one edge portion to the other edge portion of the collimator lens 12. In addition, it is possible to perform the adjustment in any range within the above-mentioned range. In addition, it is possible to dispose the profile sheet 14 behind the deflection lens 15 or behind the condenser lens 16, or other various arrangements may be adopted.

Although in the above-mentioned embodiment the correction is performed by the profile sheet 14 so that a relationship between the control angle θ of the mirror 11 and the attenuation of the optical signal HS becomes close to a linear relationship, it is possible to correct so that a relationship between the control voltage V of the mirror 11 and the attenuation of the optical signal HS becomes close to a linear relationship. The optical characteristics of the profile sheets 14 and 14B-14E should be various characteristic corresponding to the correction curves of the attenuation. For example, it is possible to adopt characteristics in which the optical transmittance decreases from one edge to the other edge of the profile sheet in accordance with various functions, characteristics in which the optical transmittance increases from one edge to the other edge of the profile sheet in accordance with various functions, or characteristics in which the optical transmittance alters from one edge to the other edge of the profile sheet in accordance with various functions.

Other than that, as to the profile sheets 14 and 14B-14E, the deflection lens 15 and 15E, the condenser lens 16, or the optical transmission systems 1 and 1B, the structure, the configuration, the shape, the number, the material, the arrangement, characteristics and the like of the entire or each part thereof can be modified if necessary in accordance with the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An optical transmission system that alters quantity of incident light by reflecting an optical signal by a micro mirror to enter an optical fiber and by controlling an angle of the micro mirror, so that attenuation of the optical signal is controlled,
wherein an optical filter and a deflection lens are disposed between the micro mirror and the optical fiber,
the optical filter to correct a relationship between a control angle or control voltage of the micro mirror and attenuation of the optical signal to be a substantially linear relationship, and
the deflection lens to deflect the optical signal to be parallel with an optical axis.

2. The optical transmission system, according to claim 1, wherein the end surface of the optical fiber is provided with a cylindrical collimator lens, and the optical signal enters the optical fiber through the collimator lens.

3. The optical transmission system according to claim 2, wherein the optical filter has optical characteristics in which optical transmittance thereof decreases from one position to another position on the outer edge thereof along a locus of the optical signal, and
the optical filter is disposed so as to correct light quantity of the optical signal that enters corresponding to a radius from the center position to a position on a circumference edge of the collimator lens.

4. The optical transmission system according to claim 3, wherein the optical filter is disposed so as to correct light quantity of the optical signal that enters corresponding to a radius of the collimator lens on the side of a larger reflection angle of the optical signal by the micro mirror.

5. The optical transmission system according to claim 2, wherein the deflection lens is disposed between the micro mirror and the optical filter, to deflect the optical signal to be parallel with an optical axis of the collimator lens.

6. An optical transmission system that alters quantity of incident light by reflecting an optical signal by a micro mirror to enter an optical fiber and by controlling an angle of the micro mirror, so that attenuation of the optical signal is controlled,
wherein an end surface of the optical fiber is provided with a cylindrical collimator lens,
an optical filter is disposed between the micro mirror and the optical fiber, to correct a relationship between a control angle or control voltage of the micro mirror and attenuation of the optical signal to be a substantially linear relationship,
a condenser lens that is a convex lens is disposed between the optical filter and the collimator lens, and
a deflection lens is disposed between the condenser lens and the collimator lens, to deflect the optical signal to be parallel with an optical axis.

7. The optical transmission system according to claim 6, wherein the condenser lens is formed in a size larger than that of the optical filter such that the optical signal from the optical filter is condensed by the condenser lens and enters the collimator lens.

8. The optical transmission system according to claim 7, wherein the optical filter has optical characteristics in which optical transmittance thereof decreases from one position to another position on an outer edge thereof along a locus of the optical signal, and
the optical filter is disposed so as to correct light quantity of the optical signal that enters corresponding to a radius from a center position to a position on a circumference edge of the collimator lens.

9. The optical transmission system according to claim 8, wherein the optical filter is disposed so as to correct light quantity of the optical signal that enters corresponding to a radius of the collimator lens on a side of a larger reflection angle of the optical signal by the micro mirror.

10. The optical transmission system according to claim 6, wherein the optical filter has optical characteristics in which optical transmittance thereof decreases from one position to another position on an outer edge thereof along a locus of the optical signal, and
the optical filter is disposed so as to correct light quantity of the optical signal that enters corresponding to a radius from a center position to a position on a circumference edge of the collimator lens.

11. The optical transmission system according to claim 10, wherein the optical filter is disposed so as to correct light quantity of the optical signal that enters corresponding to a radius of the collimator lens on a side of a larger reflection angle of the optical signal by the micro mirror.

* * * * *